United States Patent [19]

Guezou et al.

[11] Patent Number: 4,724,786
[45] Date of Patent: Feb. 16, 1988

[54] SURFACE EFFECT, SIDE KEEL VESSEL CONTAINING PERFECTED BUOYANCY SYSTEMS

[75] Inventors: Jean-Pierre R. Guezou, Athis Mons; Jean-Paul A. Bertrand; Robert J. Balquet, both of Paris; Sylvain J. A. Marcouyoux, Le Pradet; Charles V. De Smet, Massy, all of France

[73] Assignee: Etat Francais, France

[21] Appl. No.: 795,107

[22] Filed: Nov. 5, 1985

[30] Foreign Application Priority Data

Nov. 12, 1984 [FR] France ............................... 84 17169

[51] Int. Cl.$^4$ ................................................ B63B 1/38
[52] U.S. Cl. .................................... 114/67 A; 180/128
[58] Field of Search ............. 114/67 A; 180/127, 128, 180/120, 121, 122, 118, 126, 116, 117

[56] References Cited

U.S. PATENT DOCUMENTS

| | | | |
|---|---|---|---|
| 3,425,505 | 2/1969 | Jones | 180/118 |
| 3,536,156 | 10/1970 | Crago | 180/127 |
| 3,621,932 | 11/1971 | Tattersall et al. | 114/67 A X |
| 3,907,061 | 9/1975 | Chapman et al. | 180/128 X |
| 4,046,217 | 9/1977 | Magnuson | 180/126 |
| 4,090,459 | 5/1978 | Chaplin | 114/67 A |
| 4,131,174 | 12/1978 | Rickards | 180/118 |
| 4,169,514 | 10/1979 | Wheeler et al. | 180/127 |
| 4,196,686 | 4/1980 | Moran | 114/67 A |
| 4,326,477 | 4/1982 | Carter | 114/67 A |
| 4,422,517 | 12/1983 | Hammerschlag | 180/126 X |
| 4,428,448 | 1/1984 | Tattersall et al. | 180/128 |
| 4,646,866 | 3/1987 | Bertrand et al. | 180/126 |

FOREIGN PATENT DOCUMENTS 2422535 11/1979 France .

Primary Examiner—Joseph F. Peters, Jr.
Assistant Examiner—Paul E. Salmon
Attorney, Agent, or Firm—Parkhurst & Oliff

[57] ABSTRACT

A surface effect vessel of a type comprising a buoyed structure with two side keels (20), a rear seal apparatus (100) and a forward seal apparatus cooperating to delimit a central buoyancy cushion (300). The rear seal contains a horizontal extension enclosure (100). A first piping system (54) connects a pressurized air generator (50) to the enclosure (100), and a second piping system (58) connects the central cushion (300) and the pressurized air generator (50). Fluid communication holes (150) are provided between the enclosure (100) and central cushion (300). The piping system (54, 58) and the fluid communication holes (150) are defined to ensure inflation of enclosure (100) to a pressure higher than the pressure of the central cushion (300).

20 Claims, 18 Drawing Figures

U.S. Patent  Feb. 16, 1988  Sheet 1 of 5  4,724,786
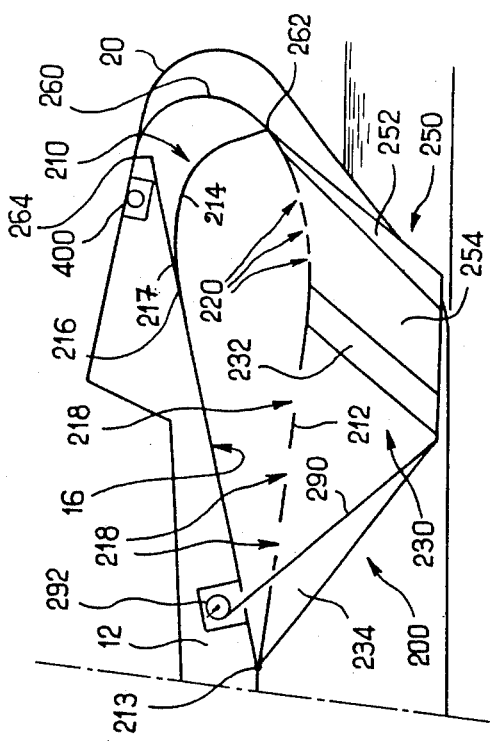
FIG._1
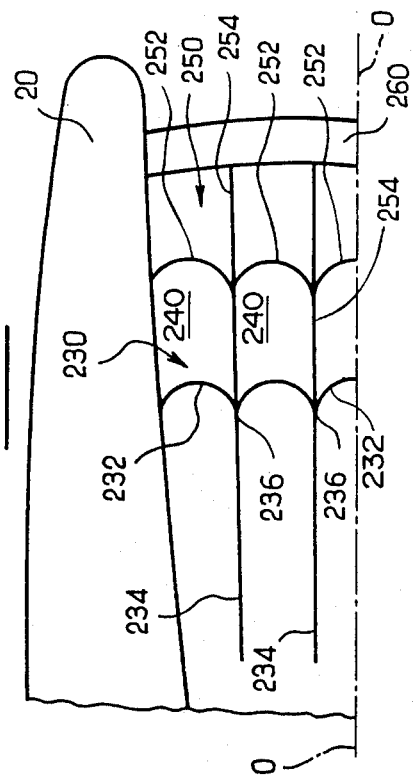
FIG._3
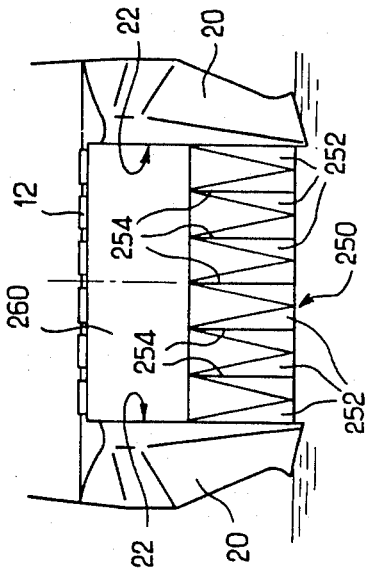
FIG._2

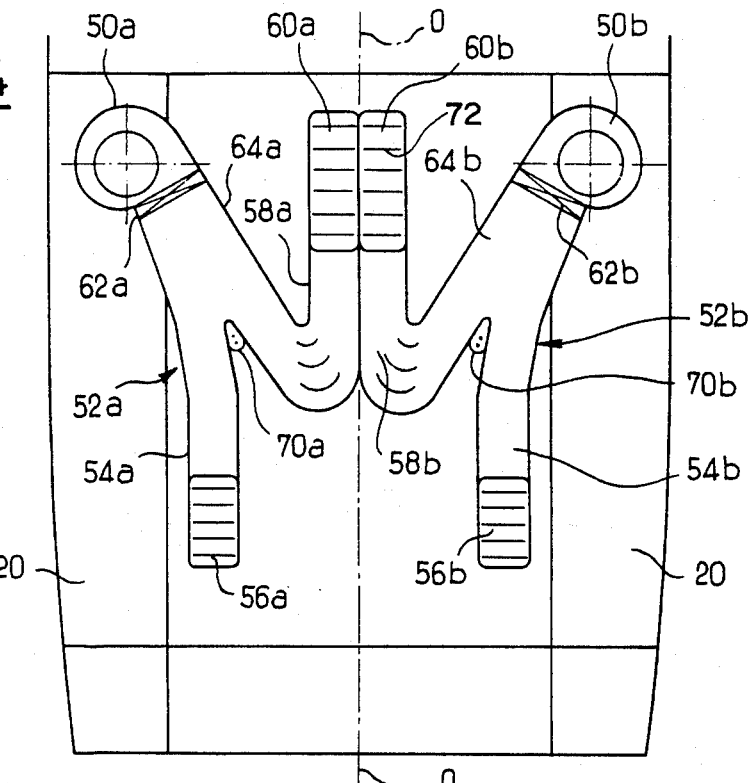
FIG._4
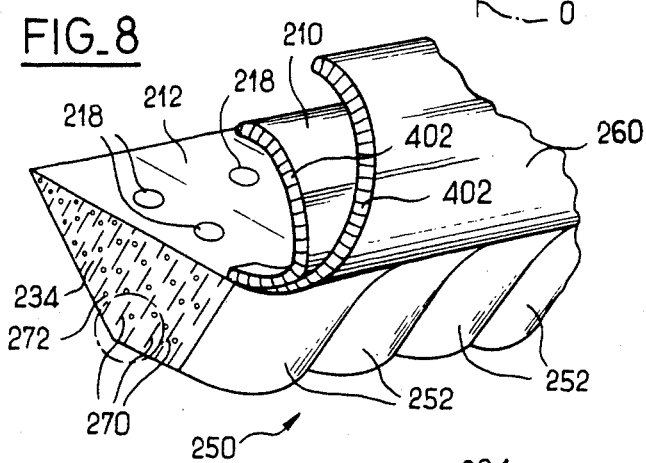
FIG._8
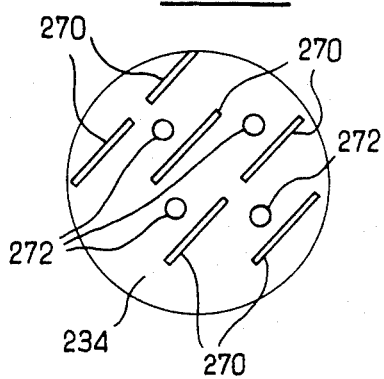
FIG._12
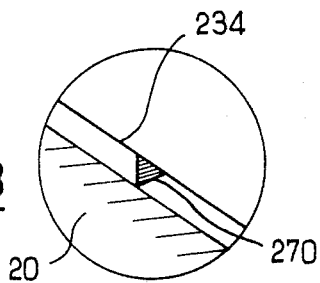
FIG._13

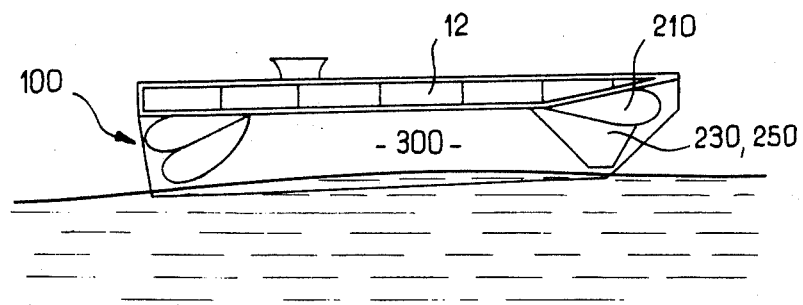
FIG._14a
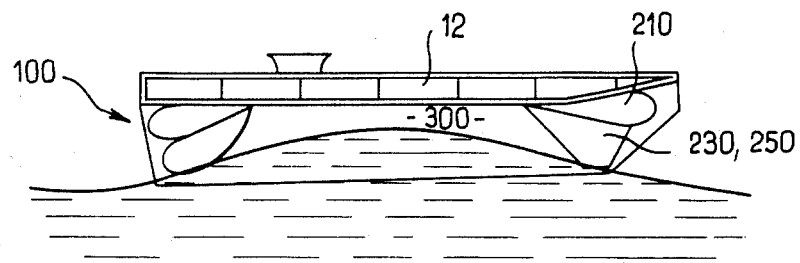
FIG._14b
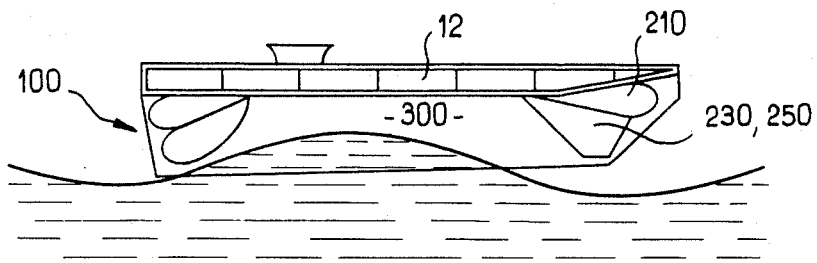
FIG._14c
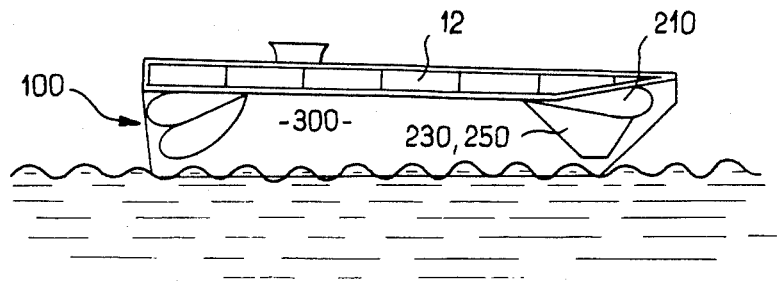
FIG._14d

SURFACE EFFECT, SIDE KEEL VESSEL CONTAINING PERFECTED BUOYANCY SYSTEMS

BACKGROUND OF THE INVENTION

This invention concerns vessels having a structure buoyed up by pressurized fluid cushions, so-called surface effect vessels.

This invention concerns more precisely surface effect vessels of a type comprising a buoyed up structure with two side keels, a rear seal apparatus and a forward seal apparatus designed to cooperate with the side keels to delimit a central buoyancy cushion supplied by pressurized air generators.

Attempts have already been made to produce such side keel, surface effect vessels.

U.S. Pat. Nos. 3,977,491, 3,987,865 and 4,090,459 and British Pat. Nos. 1,210,973, 1,242,131 or still again the French application for patent No. 2,422,535 for example illustrate different theoretical approaches to these systems.

However in practice, until now the attempts have not proved fully satisfactory insofar as concerns the pounding comfort of the vessel in all sea conditions, the following of the swell, the limitations to leaks and variations in the leak rates around the circumference of the cushions, the crossing of possible obstacles.

The inventors have, in particular, determined that the aforesaid problems encountered with the systems proposed until now were to a great extent due to the methods of supplying the central cushion and the respectively forward and rear seal apparatus on these vessels.

Generally speaking the means proposed until now to delimit the central buoyancy cushion of side keel, surface effect vessels included, forward, a multilobed skirt generally vertically open towards the central cushion, and to the aft, a horizontal extension enclosure.

Most frequently the enclosure forming the after seal is quite separate from the central cushion and connected to the pressurized air generators by associated pipes. The pressurized air supply to the enclosure is quite separate from the central cushion.

According to other and less common proposals, the forward seal apparatus and the rear seal apparatus-multilobe skirt and horizontal enclosure are supplied by separate and respectively associated pressurized air generators, whereas the central cushion is supplied indirectly via the forward and rear seal devices.

SUMMARY OF THE INVENTION

This invention proposes a surface effect vessel of a type comprising a buoyed up structure with two side keels, a rear seal apparatus and a forward seal apparatus designed to cooperate with the side keels to delimit a central buoyancy cushion applied by a pressurized air generator, in which the rear seal, produced at least partially in flexible material, contains at least one horizontal extension enclosure delimited forwardly by an internal wall inclined upwards and extending towards the center of the central cushion, first piping systems connecting the enclosure and a pressurized air generator to inflate the enclosure, second piping systems connecting the pressurized air generator to the central cushion to provide its main supply of fluid pressure, means of communication being provided between the enclosure and the central cushion as a secondary supply of fluid pressure to the cushion, the piping systems together with the means of communication being designed to inflate the enclosure at a pressure higher than the pressure of the central cushion, and the air generator having a low pressure/flow rate gradient operating characteristic in a static (stable) state of operation.

According to the invention, the piping systems and the means of communication are designed to cause a relative pressure drop $\mu AR$ between the enclosure and the central cushion of between 0.07 and 0.15, the relative pressure drop $\mu AR$ being more precisely defined by the relation:

$$\mu AR = (Pb_{AR} - PC)/Pb_{AR},$$

in which:

$Pb_{AR}$ corresponds to the mean pressure, static, in the enclosure and Pc corresponds to the pressure, static, in the central cushion.

Tests made on this buoyancy structure applying this invention have displayed that simultaneously the efficiency of the system and the pounding comfort of the vessel were distinctly improved as compared to previous proposals, without requiring either the use of active monitoring and servo systems or a power capacity oversized as compared to that required for average operating.

The systems complying with this invention in particular obtain automatic, rapid and optimum self-adaptation of the relative pressures in the seals and central cushion, whatever the operating conditions. The seals according to the invention, with high encounter frequencies with the swell, minimize the variations in leak rate, and the above referred to low gradient of the air generator characteristics permits the air generator to limit the fluctuations in pressure involved with variations in the volume of the cushion developing at low swell encounter frequencies.

According to a preferential feature of the invention, the rear seal is formed through superposition of a number of adjacent horizontal extension chambers, in fluid communication with each other.

This stack produces a suspension of several stages providing for better control of the vertical movement of the seal.

According to another preferential version complying with this invention, the enclosure is formed of an outer wall formed of a number of horizontal extension lobes each connected to the buoyed up structure by links and whose upper lobe is connected directly to the structure, and a lower lobe containing an internal extension inclined upwards and extending toward the center of the central cushion.

If required the pressurized air generator can be divided into at least two units each connected firstly to the enclosure via the first piping system, secondly to the central cushion via the second piping system. This division of the pressurized air generator into at least two units is used especially for large size surface vessels consequently requiring a large scale buoyancy cushion.

Another advantage of this system is to guarantee satisfactory navigating conditions with one single unit if the second air generation unit has failed.

According to this invention the means of communication between the rear seal enclosure and the central cushion are provided either in the internal extension of the lower lobe inclined upwards and extending toward the center of the central cushion, or in a position adjacent to the lower surface of the buoyed up structure, between the upper end of the said internal extension of the lower lobe and the aforesaid lower surface of the buoyed up structure.

Preferentially semi-hover panels, generally horizontal in use, are secured to the lower part of the enclosure.

According to another advantageous feature of the invention, drain ports are provided in the lower part of the enclosure.

Moreover the inventors have determined that, to optimize the pounding comfort of the vessel, it is necessary to use a pressurized air generator so that the global static conductance (a measure of an overall fluid flow characteristic) of the supply system $(dQ/dPc)_N$ at the nominal operating point satisfies the relation $(dQ/dPc)_N \geq 2.5(Q/Pc)_N$ in which Q is the total buoyancy fluid flow and Pc the relative overpressure of the central cushion.

Preferably the pressurized air generator is a helico-centrifugal type fan or equivalent, so as to optimize the global efficiency of the buoyancy system without prohibitively increasing the power capacity and obtaining the conditions required within the central cushion.

To do so the type of fan adopted is such that its specific rotation speed Nsq defined by $N_{sq}=N \times Q_v^{\frac{1}{2}}(Pv/\rho)^{-\frac{3}{4}}$ in which:

N is the rotation speed of the fan in rpm $\rho$
$Q_v$ is the fan's buoyancy fluid flow rate
$P_v$ is the pressure delivered by the fan
$\rho$ is the voluminal mass of the air,
is less than 70, preferably around 35 and possibly very well below 35 in the case of multi-stage fan systems.

All these systems allow for the use of low diameter fans whose integration into the architecture of the vessel is compatible with the accomodation requirements imposed.

Moreover, according to an advantageous feature of the invention, the piping systems include a Y-pipe whose common section is connected to the pressurized air generator, a first branch, generally straight, which forms the first piping system and is connected to the enclosure, and a second curved branch, forming the second piping system, is connected to the central cushion. By thus supplying the enclosure of the rear seal by the most direct circuit, pressure drops supplying the rear seal are reduced to a minimum.

Preferably, according to the invention, a moving flap is inserted on the pipe at the Y-branching point, to adjust the distribution of the air flow from the generator between the two branches.

According to another interesting feature of the invention, a system of flaps is installed on the second piping system. This system of flaps which can be easily controlled from the vessel's navigating station maintains, with full safety, a pressure in the rear seal higher than that of the central cushion.

The inventors have also concerned themselves with improving the forward seals of previously existing surface effect, side keel vessels.

For this purpose the aforesaid surface effect vessel, complying with this invention, contains a forward seal produced at least partially in flexible material, including an upper horizontal extension enclosure, extending transversely between the two side keels, which communicates with the central cushion and is supplied with fluid pressure by the latter, and two rows of lower multilobe skirts connected below the upper enclosure, extending transversally between the two side keels, which converge towards the center of the central cushion from top to bottom and whose concavity is directed towards the center of the cushion, the two rows moreover delimiting between them, intermediate chambers which communicate with the upper enclosure via ports provided in the latter's wall.

Thus, according to the invention, without any external intervention, self-adaptation of the front seal to the free surface variation conditions is obtained, so as firstly to limit the contact between the skirts and the water, which reduces their natural drag and wear, and secondly, to reduce the variations in the leak flow and hence variations of pressure in the cushion. All this naturally tends to improve the pounding comfort of the vessel.

According to another important feature of the invention, the buoyed up structure has in the front a wall inclined upwards away from the center of the central cushion, and the envelope of the upper enclosure, convex towards the outside, is connected tangentially to this inclined wall. As will be referred to in more detail further on, the stiffness of the forward suspension is linked to the inclination of the aforesaid wall to the horizontal, and can thus be easily controlled.

According to another feature of the invention, the forward seal also contains a complementary envelope installed on the front of the upper enclosure associated and connected firstly to the upper end of the most forward row of skirts, and secondly to the front of the buoyed up structure.

According to another advantageous feature of the invention, the ports provided in the upper enclosure of the forward seal to supply the latter from the central cushion and supply the intermediate chambers from the upper enclosure, are adapted to provide, statically, a pressure in the enclosure of the same order of magnitude as that in the central cushion and a pressure in the intermediate chambers between 0.3 and 0.75 times the pressure in the central cushion.

So as to provide, according to a second operating mode, for navigating on the vessel's hull in accordance with this invention, means of lifting are provided on the forward and rear seals. It can be advantageous if these means of lifting are formed of cables secured firstly to the lower part of the seals and secondly to associated winches.

Moreover so as to limit air leaks between the side keels and the ends opposite the forward and after seals which cannot be connected to the latter, flexible elements forming flip-flaps are installed on the side ends of the seals, so as to allow slippage on the internal side wall of the respectively associated keels.

BRIEF DESCRIPTION OF THE DRAWINGS

Other features and advantages of this invention will be evident on reading the following detailed description and on inspecting the drawings appended provided as nonexhaustive examples and on which:

FIG. 1 provides a schematical view with partial vertical longitudinal cross-section of a surface effect, side keel vessel complying with this invention FIG. 2 shows a front, transverse view of the same vessel FIG. 3 shows a partial schematical bottom view, of the forward portion of a surface effect, side keel vessel compying with this invention FIG. 4 illustrates schematically, with a bottom view, the pressurized air generators integrated into a surface effect, side keel vessel complying with this invention FIG. 8 illustrates the schematical perspective view of a forward seal in accordance with this invention FIG. 12 shows an enlarged side view of the side sealing antifriction beads illustrated on FIG. 8

FIG. 13 shows a view of the same side beads with a generally horizontal cross section FIGS. 14A, 14B and 14C, 14D show schematically the performance of a vessel according to the invention, respectively on a swell with very great wavelength, a swell of intermediate wavelength and on short swells.

DETAILED DESCRIPTION OF THE PREFERRED EMBODIMENTS

Figure 5:
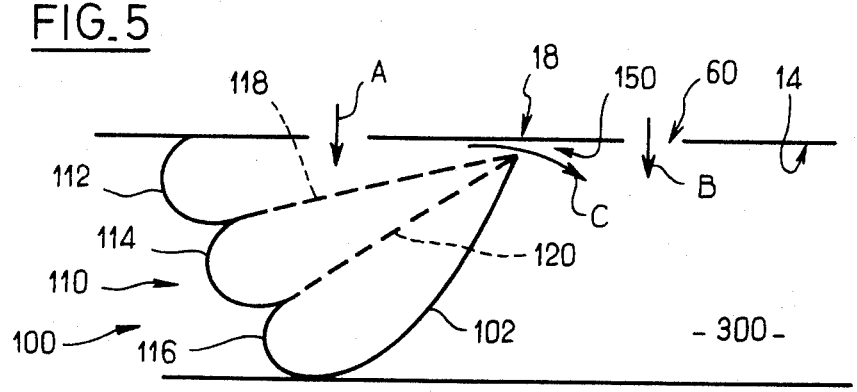
FIG. 5 illustrates schematically a first alternative version of producing the after seal in accordance with this invention, with a longitudinal vertical cross-section view

The figures, especially FIGS. 1 to 3, show a surface effect vessel 10 complying with this invention, containing a buoyed up structure 12 with two side keels 20 and also containing a rear seal apparatus 100 and forward seal apparatus 200 designed to cooperate with the side keels 20 to delimit the central buoyancy portion 300 supplied by a pressurized air generator, or fan, 50.

The geometry of the buoyed up structure 12 shown on the figures should naturally not be considered as exhaustive. The sample applies to the geometry of the side keels 20.

Nevertheless it can be observed that, as shown on FIG. 1, the lower surface 14a of the buoyed up structure 12 is basically generally horizontal, with the exception of the most forward portion, item 16 on FIG. 1, which is inclined upwards away from the center of the central cushion 300.

Moreover, according to the method of construction shown on the figures, especially FIG. 2, the internal side surfaces 22 of keels 20 generally extend vertically perpendicular to the seals.

We shall now describe the rear seal 100 and the associated supply systems.

This rear seal basically consists of a horizontal extension enclosure, extending transversally to the vessel between the two keels 20.

The internal volume of the enclosure 100 is connected to the aforesaid pressurized air generator 50 via the first piping systems 54, whose geometry will be described in more detail later, which emerge in holes 56, provided in the lower wall of the buoyed up structure 12 above chamber 100, as shown on FIG. 1. Preferably the first piping systems are equipped with a blading system (FIG. 1).

Communication holes 150 are moreover provided on the front of the chamber 100 so that the pressurized air supply to the central cushion 300 is obtained partially via rear enclosure 100.

This enclosure is delimited forward, as shown for example on FIG. 1, by an internal wall 102 (convex to the cushion in use) inclined upwards and extending towards the center of the central cushion.

Different versions of enclosure 100 can be adopted according to the invention. Several of these versions are illustrated on FIGS. 5 to 7.

According to the method of construction illustrated on FIG. 5 (which is generally similar to the one illustrated on FIG. 1), enclosure 100 is limited by rear outer wall 110 (by the aforesaid forward wall 102, and at the sides by two vertical walls internal to the side keels).

More precisely, the rear outer wall 110 is formed of a number of lobes 112, 114, 116 with horizontal extensions. Lobes 112, 114, 116 are convex to the outside.

Each lobe 112, 114 and 116 can for example, consist of a generally cylindrical surface with a horizontal generatrix, these surfaces being connected tangentially two by two.

Cables 118, 120 connect each of the lobes 112, 114, 116 to the buoyed up structure 12. More precisely the aforesaid cables 118, 120 connect the areas common to adjacent lobes 112, 114, 116 to a point 18 on the lower surface 14a of the buoyed up structure, placed forwards in relation to the rear outer wall 110. The aforesaid point 18 can advantageously be placed in the vicinity of the upper end of the forward wall 102.

Cables 118, 120 can if required be replaced by well drilled walls also connecting lobes 112, 114 and 116 to the lower surface 14a of the buoyed up structure. These drilled walls are functionally equivalent to cables 118, 120.

According to the method of construction shown on FIG. 1, communication holes 150 are provided in the forward wall 102 practically at mid height.

According to the method of construction shown on FIG. 5, communication holes 150 connecting the internal volume of enclosure 100 to central cushion 300 are adjacent to the lower surface 14a of the buoyed up structure 12.

In this first version shown on FIGS. 1 and 5, at each moment the pressure is the same in the whole volume of the enclosure 100.

Figure 6A:
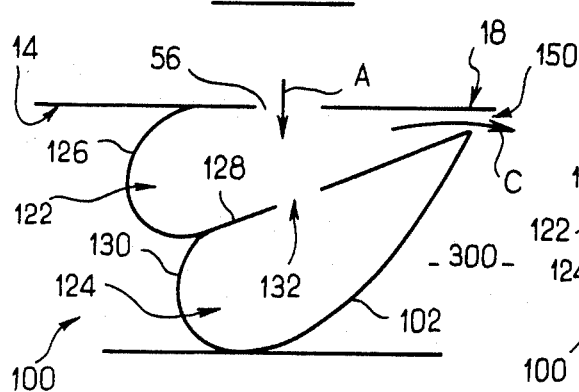
FIG. 6A illustrates schematically a second version of producing an after seal in accordance with this invention, according to a similar vertical cross-section view

According to the method of construction shown on FIG. 6A, the rear seal 100 is formed of several superposed chambers, numbering two in this case, according to the method of construction shown, itemized respectively 122 and 124.

Apart from the vertical side delimitation surfaces, parallel to the plane of FIG. 6A, the upper chamber 122 is delimited by a rear wall convex to the outside, for example cylindrical revolution 126, integral with generally flat wall 128 inclined upwards and extending towards the center of the central cushion 300.

The aforesaid wall 126, generally extends horizontally transverse to the ship across the two side keels 20. The upper horizontal generatrix of wall 126 is connected to the lower surface 14a of the buoyed up structure 12, while the lower horizontal generatrix of the same wall 126 is connected to wall 128, the latter being moreover, through its forward end, connected to the lower surface of the buoyed up structure 12.

The lower chamber 124 is delimited by the same wall 128, an outer wall 130 convex to the outside, with generally horizontal extensions, for example, a cylindrical revolution and the aforesaid wall 102. Holes 56 connecting with the piping systems 54 provided in the buoyed up structure 12 emerge in the upper chamber 122. This latter communicates via holes 132 provided in the intermediate wall 128, with lower chamber 124.

Moreover communicating holes 150 connecting the internal volume of the after seal 100 and the central cushion 300 are provided, in a similar way to the methods shown in FIG. 5, in the position adjacent to the lower surface 14a of the buoyed up structure 12.

Holes 132 are sized to ensure balanced inflation of the separate chambers 122, 124 at the same pressure.

Figure 6B:
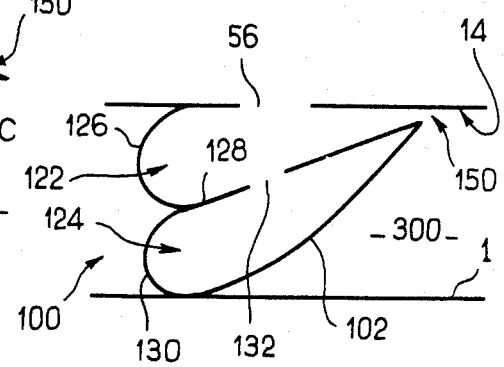
FIG. 6B illustrates the performance of the after seal in accordance with the second version shown on FIG. 6A, on a relative elevation of the free surface

Nevertheless as illustrated on FIG. 6B, dynamically, under the effects of the variations in volume of the different enclosures, the pressures in each enclosure 122, 124 take on separate values.

In the case for example of a relative rise in the free surface 1, the pressure inside the lower chamber 124 will be higher than the pressure prevailing inside the upper chamber 122, insofar as the latter is directly connected via communicating holes 150 with central cushion 300. According to the method of construction shown on FIG. 7, the rear seal 100 consists of three chambers 134, 136 and 138, superposed. Hereafter these chambers will be referred to respectively as upper, intermediate, lower chambers.

These three chambers include respectively a rear wall, convex to the outside, with horizontal extension, for example, a cylindrical revolution itemized respectively 140, 142 and 144.

The upper generatrix wall 140 is connected to the lower surface 14a of the buoyed up structure. The lower generatrix of wall 140 is connected to the upper generatrix of the adjacent wall 142. The lower generatrix of the latter is connected to the upper generatrix of the subjacent wall 144, whereas the lower generatrix of the latter is prolonged by the aforesaid inner wall 102.

Moreover the upper chamber 134 is separated from the intermediate chamber 136 by sheet 146 inclined upwards and extending towards the center of the central cushion, connected firstly in common to rear walls 140 and 142, and secondly to the lower surface 14a at the buoyed up structure 12, forward.

In a similar way the intermediate chamber 136 is separated from the lower chamber 138 via sheet 148 inclined upwards and extending towards the center of the central cushion 300 and connected firstly in common to walls 142 and 144 and secondly to the lower surface 14a and the buoyed up structure 12, forwards.

Figure 7:
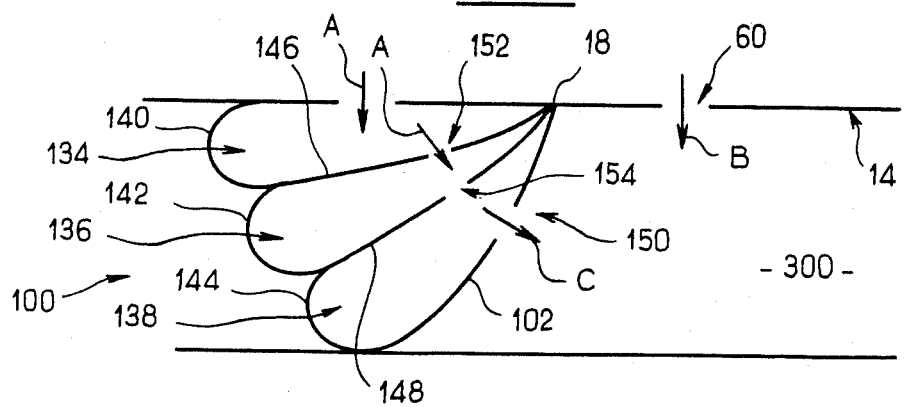
FIG. 7 shows a third version of a rear seal in accordance with this invention, with a longitudinal vertical cross-section view

According to the method of construction shown on FIG. 7, sheets 146 and 148 and wall 102 are connected in common to the lower surface 14a of the buoyed up structure, in 18.

Opening 56 on which emerges the first piping systems 54 is provided opposite the upper chamber 140. The first holes 152 are provided in sheet 146 and the second holes 144 in sheet 148, firstly in order to communicate between the upper chamber 140 and intermediate chamber 136 and secondly between the latter and the lower chamber 138.

Moreover the aforesaid communicating holes 150 are provided in wall 102, practically at mid height.

Holes 152 and 154 are sized to provide a pressure drop from the upper chamber 134 to the lower chamber 138.

The result is that the different chambers 134, 136 and 138 are inflated to different pressures.

On the figures the supply of the rear seal 100 by the first piping system 54 is illustrated by arrows marked A.

As shown on the figures the central cushion 300 delimited by the side keels 20, forward seal 200 and rear seal 100 is also directly connected to the pressurized air generator 50 via a pipe itemized at 58 on the figures emerging in the central cushion on port 60 provided in the lower wall of the buoyed up structure 12.

If required the pressurized air generator 50 can be divided into at least two units each connected firstly via the second piping system 58 to the central cushion 300, secondly via the first piping system 54, to enclosure 100.

This arrangement is illustrated in particular in FIG. 4 in which two fans 50 each associated with a set of pipes 54, 58 are shown respectively on either side of the vessel's longitudinal axis 0—0. In FIG. 4 the fans and associated pipes are matched respectively with index a and b according to their position in respect to the longitudinal axis 0—0.

In the case in which the buoyed up structure consists of an inter-hull linkage tank as shown for example in FIG. 1, the units (50a, 50b) of the first and second piping systems (54a, 54b, 58a, 58b) are installed inside the said tank, the piping system being obtained with a pratically horizontal layout. As may be seen, this tank is delimited by the upper surface 14b and lower surface 14a.

Units 50a, 50b consist of vertical axis fans whose intake ear is installed horizontally in the upper part of the tank forming deck.

In such a case the fans 50 and associated circuits 54–58 are preferably symmetrical to the longitudinal axis 0—0 and operate parallel.

More precisely, according to the preferential method of construction shown on FIG. 4, the air taken from the atmosphere by each fan 50, as illustrated schematically by the arrows marked P on FIG. 1, is channeled from the outlet of fan 50 to a Y-pipe 52.

It is advantageous if each fan is equipped with a non-return valve 62 of known design on its outlet when several units are scheduled parallel. Moreover, when operating with a single unit, the valve on the second unit (not operating) will be kept closed.

Still more precisely, the aforesaid Y-pipe 52 contains a common section 64 and two branches 54, 56 previously referred to.

The common sections 64 is connected to the outlet of the associated fan 50.

A first branch 54 of the pipe, generally straight to reduce pressure drops to a minimum, emerges in holes 56, opposite enclosure 100 of the rear seal, through a blading system 56a, 56b notably designed to direct the air judiciously towards the after seal.

Lastly the second curved branch 58, which emerges in port 60, supplies the central cushion 300.

An adjustable flap 70 located on the Y-branch point between pipes 54 and 58, schematically illustrated on FIG. 4, adjusts the distribution of the flow between the two pipes.

Moreover, preferably, a system of flaps 72 containing a number of flaps mounted pivoting around horizontal axes and pivoting position control from the vessel's navigating station, is provided on holes 60.

The system of flaps 72 maintains a pressure in the rear seal 100 higher than that in the central cushion 300.

This system also closes off the air outlet 60 when navigating on the vessel's hull as explained hereafter.

As has been already referred to, according to the invention, to optimize the pounding comfort of the vessel in all sea conditions, the pressurized air generator 50 has air pressure/flow rate variation characteristics on output, which at the nominal operating points (points set for stable operation) have the lowest possible gradient. More precisely, the pressure/flow rate variation characteristics of the fans are, according to the invention, less than 1/10th of $Pa/m^3/sec$.

For this purpose according to the invention, it is advantageous if the fans 50 are helico-centrifugal or equivalent type.

It is known that the dynamic operating of a fan illustrated by the pressure variation/flow rate variation curve is featured by closed loops, centered on the static characteristics. This curve moreover flattens out at low frequencies coming close to the static characteristic whereas the same curve evolves towards generally elliptical forms at high frequencies.

Thus as shown in FIGS. 14a, b, c, d:
- on swells with very great wavelength ($\lambda/L \geq 4.5$) in which L is the length of the cushion and $\lambda$ the wavelength of the swell, through the archimedian lift of the hulls and the low apparent swell gradient, the vessel follows the deformation of the free surface (FIG. 14a);
- on intermediate swells ($4.5 \geq \lambda/L \geq 1.2$) the excitations due to the variations in the cushion volume (piston effect) and variations in the leak height under the seals are maximum. Occuring at relatively low frequency, these excitations in view of the described flat operating characteristics of the fan, only induce moderate variations in the cushion threshold (FIGS. 14b and c);
- on shorter swells, the ship follows the mean level of the free surface. The task of the seals' suspensions is then to limit the fluctuations in the leak flow and consequently the variations in pressure (FIG. 14d).

This optimizes the vessel's pounding comfort.

As has been previously referred to the central cushion 300 is supplied partly directly by fan 50 (via pipe 58), partly indirectly, via after seal 100.

On the figures these direct and indirect supplies to the cushion are illustrated respectively by the arrows marked B and C.

The cross-sections of pipes 54, 58, associated holes 50, 60 and of the holes provided in the walls of the after enclosure 100 (holes itemized 150, 152 and 154) are sized to maintain in enclosure 100 a pressure constantly higher than that prevailing in the central cushion 300.

More precisely still according to the invention, the piping systems 54, 58 and communicating holes 150 are designed to determine a relative pressure drop $\mu AR$ between enclosure 100 and central cushion 300 of between 0.07 and 0.15. The relative pressure drop $\mu AR$ is defined by relation: $\mu AR = (Pb_{AR} - Pc)/Pb_{AR}$ in which $Pb_{AR}$ corresponds to the mean pressure, static, in enclosure 100 and Pc corresponds to the pressure, static, in central cushion 300.

The aforesaid feature optimizes the efficiency of the suspension due to the buoyancy cushion whilst minimizing the total buoyancy power.

Whilst enabling the vessel to operate either as a surface effect vessel buoyed up by pressurized fluid cushion, or to navigate on the hull, means are provided to lift the rear seal 100.

According to the method of construction shown on FIG. 1, these means of lifting include cables or straps 190 associated to winch systems 192, installed on the buoyed up structure 12.

More precisely the cables 190 which generally extend vertically inside the after seal are connected firstly at the lower end, to the low point of enclosure 100 at 194, secondly to winch 192, for this purpose passing through a ball 30 provided in the lower wall of the buoyed up structure 12.

Nevertheless to limit leaks between the side keels 20 of the vessels and the sides of the rear seal 100, flexible elements 180 forming drip-flaps are preferably installed on the side ends of enclosure 100. These drip-flaps are designed to slip on the side wall of the keel associated to them, whilst providing the sealing.

Advantageously the geometry of these drip-flaps 180 corresponds closely to the geometry, considered in the longitudinal vertical section, of the outer wall of the enclosure.

These drip-flaps which rest against the side keels 20 through the internal pressure of the rear seal contribute to the transverse rigidity of the seal.

Panels, generally horizontal, 160 can be seen on FIG. 1, installed on the lower part of enclosure 100 and placed in contact with the water.

These panels 160 fulfill a triple function.

Firstly they fulfill a hover function. The force applied to these panels during contact with the free surface tends to retract the rear seal.

Moreover these panels 160 reinforce the lower part of enclosure 100 and limit the wear on it. Finally these panels 160 channel the leak flow so as to reduce the drag.

Note also the presence of drain holes 162 in the lower part of the after seals. These holes 162 can be provided for example in a low area common to wall 102 and panels 160.

We shall now describe the structure of forward seal 200 shown on the figures.

This forward seal 200 basically consists of an upper horizontal extension enclosure 210 and two rows of multilobe skirts, supported in its lower part, itemized respectively 230 and 250, generally speaking.

The upper enclosure 210, according to the method of construction shown on the figures, consists firstly of a lower wall 212, generally horizontal, which is connected at the rear to the lower surface 16 of buoyed up structure 12, at 213, and which extends forwards via wall 214, convex to the outside and generally inclined upwards, connected to the lower surface 16 of buoyed up structure 12 in 216.

The aforesaid wall 214 can for example be cylindrical revolution, with horizontal generatrix.

Moreover as shown in figures, the upper edge of the forward wall 214 which is facing backwards, connects tangentially to the inclined surface 16 of the buoyed up structure 12.

Naturally, to ensure the forward sealing of central cushion 300, the aforesaid upper enclosure 210 extends traversally to the ship, the length of the said enclosure 210, considered traversally to the longitudinal axis 0—0, being practically equal to the length between the two side keels 20.

The same applies to the aforesaid rows of skirts 230 and 250.

Skirt 230 the furthest aft is formed of a number of lobes 232 generally cylindrical, whose axes converge towards the center of the cushion, from top to bottom, as shown on the figures, the concavity of lobes 232 being opened towards the central cushion 300, i.e., towards the rear of the vessel, to prevent baling.

More precisely, lobes 232 are delimited by hemicylindrical envelopes extending to the rear by holding walls 234 parallel to the longitudinal axis 0—0 of the vessel.

More precisely according to the method of construction shown, walls 234 are of triangular form, and connected by their upper head to wall 212 generally horizontal, of upper enclosure 210.

The most forward skirt 250 is formed of the same number of lobes 252.

These lobes 252 are placed respectively opposite the aforesaid lobes 232, on the front of them.

Here again lobes 252, generally hemi-cylindrical, converge towards the center of central cushion 300 from top to bottom. The concavity of lobes 252 is open towards central cushion 300, i.e., towards the stern of the vessel, so as to prevent baling.

The aforesaid lobes 252, practically hemi-cylindrical, extend aft via flat walls 252, parallel to the longitudinal axis 0—0 of the vessel, and connected firstly by their upper edge to wall 212 of the upper enclosure 210 and secondly via their after free edge inclined to the vertical, at the level of the line of adjacence 236 of the after lobes 232, as shown especially on FIG. 3. Also note that according to the method of construction shown on the figures, lobes 252 are connected at their upper end to enclosure 210 by a practically straight and horizontal linkage.

In this way as shown in the front view of FIG. 2, the envelope of lobes 252 appears in the form of a combination firstly of a general upper plane triangle whose base defines the linkage with upper enclosure 210 the apex facing downwards and secondly to conical sectors connected on either side of the aforesaid triangle.

The two skirts 230 and 250 previously referred delimit between them a series of intermediate chambers itemized 254.

These chambers 254 communicate with upper enclosure 210 via holes 220. Moreover the latter communicates with the central cushion 300 by holes 218 provided in wall 212 of enclosure 210.

According to an important feature of this invention the ports 218 providing communication between the upper enclosure 210 and central cushion 300 are defined in such a way that the pressure prevailing in the upper enclosure 210 is practically equal to that in the central cushion 300, statically.

Moreover holes 220 communicating between upper enclosure 210 and intermediate chambers 254 are sized to provide a pressure drop such that the pressure, static, inside intermediate chambers 254 is between 0.3 times and 0.75 times the pressure in the central cushion 300. The intermediate chambers 254 thus form a transition area between the pressure of the central cushion 300 and the outside atmospheric pressure. This arrangement reduces the cushion's wave resistance.

Moreover the inventors have observed that the relative preferential pressure values referred to above constantly provide optimum development of skirt 230 and 250, whatever the navigating conditions.

Figure 9:
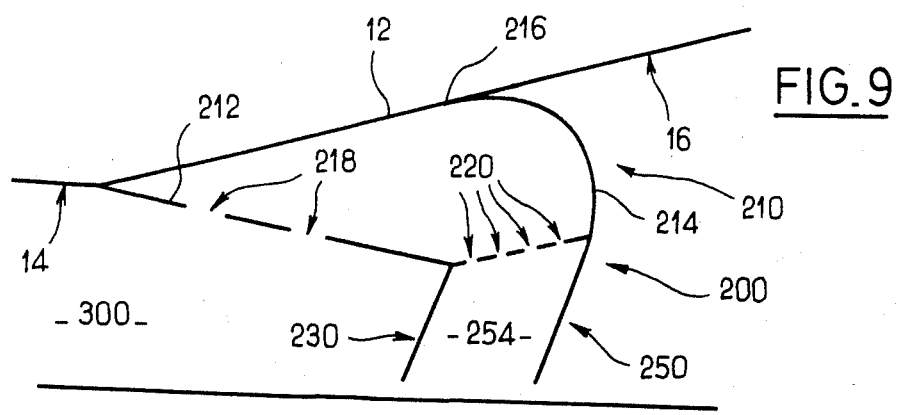
FIG. 9 illustrates a first version of a forward seal in accordance with this invention along a longitudinal vertical cross-section view
Figure 10:
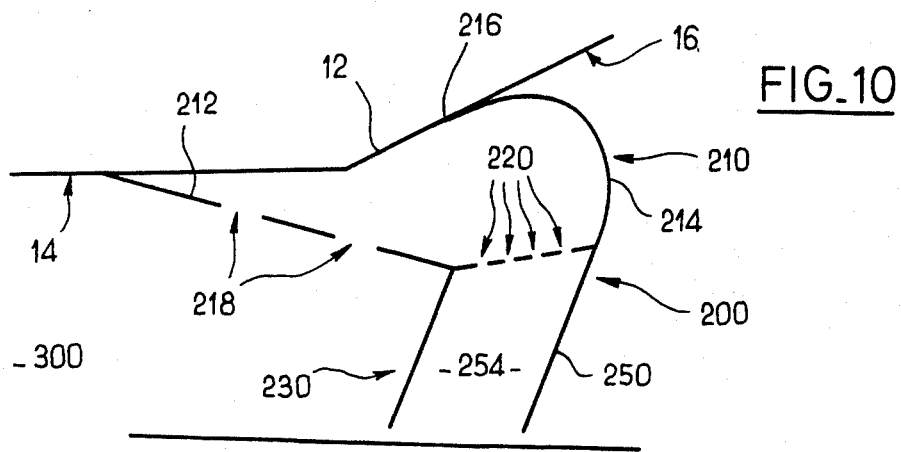
FIG. 10 illustrates schematically a second version of a forward seal in accordance with this invention, along a similar longitudinal cross-section view
Figure 11:
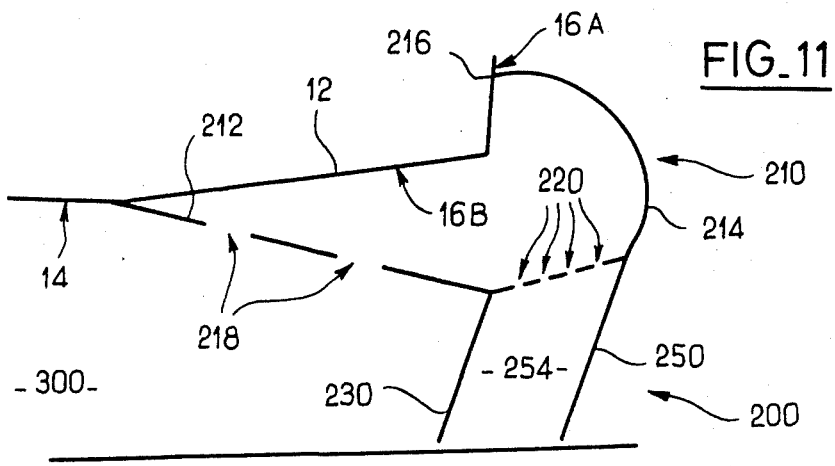
FIG. 11 illustrates a third version of a front seal in accordance with this invention with a similar longitudinal vertical cross-section view

As illustrated on FIGS. 9 to 11, the inclination to the horizontal of the forward inclined surface 16 of the buoyed up structure 12, to which the upper end of wall 214 is connected, can take on various values according to the application.

The choice of the inclination is determined contingent on the stiffness of suspension required, aware that the stiffness of the suspension is directly linked to the inclination of surface 16 to the horizontal.

The professional can in fact easily understand that, when surface 16 has a shallow inclination to the horizontal as shown on FIG. 9, on a relative elevation of the free surface in relation to the vessel, the contact between the forward 214 and inclined wall 216 considerably limits the upward movement of the forward seal. The stiffness of the suspension is then considerable.

When as shown on FIG. 10, the inclination to the horizontal of surface 16 of the buoyed up structure 12 is average, the upward movement of the forward seal is reinforced. The flexibility of the suspension is then greater.

Finally, in an extreme case, as shown on FIG. 11, the aforesaid surface 16 is divided into first section 16B shallowly inclined to the horizontal, extending forward by second section 16A practically vertical, to which the aforesaid wall 214 of upper enclosure 110 is connected, a considerable movement upwards of the upper enclosure 210 and of the whole of the forward seal is authorized in case of a relative elevation in the free surface. Suspension flexibility is then optimum.

As shown on FIG. 1, if required, a complementary envelope 260 can be placed on the front of upper enclosure 210, being connected firstly at 260 to the upper end of the most forward row of skirts 250, and secondly, at 264 to the transom of the buoyed up structure.

Preferably this complementary envelope 260 convex to the outside, is formed of a cylindrical revolution envelope with horizontal generatrix.

The complementary envelope 260 is then connected to the upper enclosure 210 via holes provided in wall 214 and not shown on the figures to simplify the illustrations.

Moreover to authorize the operating of the vessel, either by buoyancy or on pressurized fluid cushions, or navigating on the hull, here again means of lifting are preferably associated to the forward seal 200.

According to the method of construction shown on FIG. 1, these means of lifting generally speaking consist of cables or straps 290 secured firstly in the lower part of the forward seal, for example to the row of skirts 230 furthest inside, and secondly associated to a winch 292 supported by the buoyed up structure 12. Moreover according to a version shown on FIG. 1, a winch 400 can lift envelope 260.

In this case the flexible elements forming drip-flaps are here again installed on the side ends of the forward skirt so as to slip on the side wall of the respectively associated keel.

According to a method of construction considered at present as preferential, flexible elements forming drip-flaps are formed, as shown on FIG. 12, of a number of rows of anti-friction beads 270, straight and intermittent, offset longitudinally from one row to another. These anti-friction beads 270 are more precisely placed on the outer surface of the side walls 234. Preferably the anti-friction beads 270 are inclined to the horizontal similar to the generatrix of lobes 232.

Moreover air lube holes 272 are provided in the side walls 234 so as to limit the friction of the anti-friction beads 270 and the side walls of keels 20.

As shown on FIG. 13, the straight section of the anti-friction beads 270, considered perpendicularly to their general extension, is preferably practically triangular, the apex of this section resting on the side surfaces of keels 20.

Naturally this invention is in no way limited to the methods of construction just described but extends to all version complying with its idea.

Preferably sealing elements forming drip-flaps 402 are placed on the side ends of the upper enclosure 210 and of the complementary envelope 260, as shown on FIG. 8.

For example the internal side surfaces of keels 20 need not be vertical.

In this case the geometry of the multilobe skirts 230 and 250 is adapted in consequence. For this purpose for example, the side lobes of the skirts can be of a general truncated cone form to provide close contact with the forward seal and side keels so as to limit leaks as far as possible. Similarly, the geometry of the upper enclosure 210 can be easily adapted to that of the side keels 20.

Preferably the seals are produced in flexible, neoprene-coated fabric.

We claim:

1. A surface effect vessel comprising a buoyed up structure with two side keels, a rear seal and a forward seal designed to cooperate with said side keels to delimit a central buoyancy cushion supplied at a pressure by a pressurized air generator, a first pipe connecting said generator to said rear seal for inflating said rear seal, a second pipe connecting said generator to said central cushion providing a main fluid supply thereof, wherein:
   said rear seal is at least partially of flexible material and contains at least one horizontal extension enclosure delimited forwardly by an internal wall inclined upwardly and attached between said keels on a lower surface of said structure;
   fluid communication holes are arranged between said enclosure and said central cushion for providing a secondary fluid supply of said cushion;
   said first and second pipes and said fluid communication holes are adapted to ensure inflation of said enclosure at a pressure higher than said pressure of said central cushion;
   said generator has a pressure/flow rate operating characteristic such that its pressure varies with its flow rate with a low gradient to limit variations in pressure of said central cushion during varying navigation conditions;
   and wherein said fluid communication holes and first and second pipes are adapted to define a relative pressure drop $\mu_{AR}$ between said enclosure and said central cushion in a range of 0.07 to 0.15, said pressure drop being defined by the relation:

$$\mu_{AR} = (Pb_{AR} - Pc)/Pb_{AR}$$

wherein $Pb_{AR}$ corresponds to a mean pressure in a static condition in said enclosure, and Pc corresponds to a pressure in a static condition in said central cushion.

2. The surface effect vessel of claim 1, wherein said rear seal comprises a superposition of adjacent horizontal extension chambers in fluid communication with each other.

3. The surface effect vessel of claim 1, wherein said enclosure is formed of an outer wall made of a number of horizontally extending lobes, each connected to said buoyed up structure by linkages wherein an upper lobe is connected directly to said structure and a lower lobe extends to said internal wall.

4. The surface effect vessel of claim 3, wherein semi-hover panels, generally horizontal during operation of the surface effect vessel, are fastened to said lower lobe at a lower part thereof.

5. The surface effect vessel of claim 4, wherein drain ports are provided in said lower part of said lower lobe.

6. The surface effect vessel of claim 4, further comprising means for lifting said seals.

7. The surface effect vessel of claim 6, wherein said means for lifting include cables secured at one end to said lower part of said seals and secured at an opposite end to winches carried by said buoyed up structure.

8. The surface effect vessel of claim 1, wherein said pressurized air generator contains at least two units, each unit being connected, firstly via said second pipe to said central cushion, and secondly via said first pipe to said enclosure.

9. The surface effect vessel of claim 8, wherein said units are respectively installed on each side of said vessel so that one unit can alone buoy up the vessel, the other unit on the opposite side to the one operating adapted to be blocked off by a nonreturn valve system.

10. The surface effect vessel of claim 8, wherein said buoyed up structure comprises an inter-hull linkage tank delimited by an upper surface of said structure and said lower surface, in which said air generator units and said first and second pipes are located, said pipes being approximatively parallel to said lower surface.

11. The surface effect vessel of claim 10, wherein said air generator units comprise vertical axis fans, with intake ears installed horizontally relative to said upper surface.

12. The surface effect vessel of claim 1, wherein said holes of communication are adjacent to said lower surface of said buoyed up structure.

13. The surface effect vessel of claim 1, wherein said pressurized air generator has a pressure/flow rate characteristic with an overall static conductance dQ/Pc such that $(dQ/Pc)_N \geq 2.5(Q/Pc)$, wherein Q is a total buoyancy fluid flow and Pc is the pressure of said cushion at a nominal operating point N.

14. The surface effect vessel of claim 1, wherein said pressurized air generator is a helico-centrifugal type fan, having a specific rotation speed (Nsq) lower than 70, wherein $$Nsq = N \times Qv^{\frac{1}{2}} \frac{(Pv)^{\frac{3}{4}}}{\rho},$$

and

N is a rotation speed of the fan in rpm;
Qv is a fan's buoyancy fluid flow rate;
Pv is a pressure delivered by the fan; and
$\rho$ is a voluminal mass of the air.

15. The surface effect vessel of claim 1, wherein said first and second pipes comprise a Y-pipe whose common section is connected to said pressurized air generator, said Y-pipe having one branch extending generally straight forming said first pipe connecting to said enclosure, said Y-pipe having a second curved branch forming said second pipe connected to said central cushion.

16. The surface effect vessel of claim 1, further comprising a moving flap in said Y-pipe at the confluence of said first and second branches to adjust a distribution of the air flow from said generator between said first and second branches.

17. The surface effect vessel of claim 16, further comprising a system of flaps in said second pipe.

18. The surface effect vessel of claim 17, wherein said flaps are closeable to block off said second pipe during navigation on a hull of said vessel.

19. The surface effect vessel of claim 1, further comprising a blading system in said first pipe.

20. The surface effect vessel of claim 1, further comprising flexible elements on a side portion of said enclosure, said flexible elements adapted to slip on the respectively associated said keels along said side portion.

* * * * *